US009355076B2

(12) United States Patent
Herlein (10) Patent No.: US 9,355,076 B2
(45) Date of Patent: May 31, 2016

(54) METHOD AND SYSTEM FOR DYNAMIC PLAY LIST MODIFICATION

(75) Inventor: Gregory Charles Herlein, San Francisco, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 68 days.

(21) Appl. No.: 12/737,888

(22) PCT Filed: Jul. 31, 2009

(86) PCT No.: PCT/US2009/004416
§ 371 (c)(1),
(2), (4) Date: Feb. 25, 2011

(87) PCT Pub. No.: WO2010/027397
PCT Pub. Date: Mar. 11, 2010

(65) Prior Publication Data
US 2011/0154173 A1    Jun. 23, 2011

Related U.S. Application Data

(60) Provisional application No. 61/191,051, filed on Sep. 5, 2008.

(51) Int. Cl.
*G06F 17/00* (2006.01)
*G06F 17/22* (2006.01)
(Continued)

(52) U.S. Cl.
CPC .......... *G06F 17/2247* (2013.01); *G06F 17/211* (2013.01); *H04N 21/26258* (2013.01);
(Continued)

(58) Field of Classification Search
CPC ............ G06F 17/218; G06F 17/30772; G06F 17/277; G06F 17/30056; G06F 17/211; G06F 17/227; G06F 17/2247; H04N 21/26258; H04N 21/4825; H04N 21/8543
USPC .................................................. 715/201–202
See application file for complete search history.

(56) References Cited

U.S. PATENT DOCUMENTS 6,526,411 B1    2/2003  Ward
6,748,395 B1    6/2004  Picker et al.
(Continued)

FOREIGN PATENT DOCUMENTS

IT    UD20070095    8/2007
JP    2007/282048    10/2007
(Continued)

OTHER PUBLICATIONS

Kari Pihkala et al, Design of a Dynamic SMIL Player, 2002, IEEE, pp. 189-192.*
(Continued)

*Primary Examiner* — Scott Baderman
*Assistant Examiner* — Howard Cortes
(74) *Attorney, Agent, or Firm* — Robert D. Shedd (57) ABSTRACT

Asynchronous message delivery to a media player is defined wherein the message provides instructions to change the SMIL (or XML) based play list dynamically at runtime without creation or provision of any entirely new play list. This play list modification does not result in a visible, distracting transition as would normally occur during an instruction to reload the SMIL play list. Changes to the media presentation occur without the visually disruptive page reload.

10 Claims, 5 Drawing Sheets

(51) Int. Cl.
  *G06F 17/21* (2006.01)
  *H04N 21/262* (2011.01)
  *H04N 21/482* (2011.01)
  *H04N 21/643* (2011.01)
  *H04N 21/81* (2011.01)
  *H04N 21/8543* (2011.01)

(52) U.S. Cl.
  CPC ..... *H04N21/4825* (2013.01); *H04N 21/64322* (2013.01); *H04N 21/812* (2013.01); *H04N 21/8543* (2013.01)

(56) References Cited

U.S. PATENT DOCUMENTS

| | | | |
|---|---|---|---|
| 7,254,618 | B1 | 8/2007 | Swenson et al. |
| 7,363,314 | B2 | 4/2008 | Picker et al. |
| 7,631,330 | B1 * | 12/2009 | Des Jardins ............ 725/44 |
| 2002/0169806 | A1 * | 11/2002 | Wang et al. ............ 707/541 |
| 2003/0009452 | A1 * | 1/2003 | O'Rourke et al. ........ 707/3 |
| 2003/0028505 | A1 * | 2/2003 | O'Rourke et al. ........ 707/1 |
| 2004/0073951 | A1 * | 4/2004 | Bae et al. ............ 725/135 |
| 2005/0021500 | A1 * | 1/2005 | Plastina et al. ........ 707/1 |
| 2005/0187756 | A1 * | 8/2005 | Montgomery et al. ....... 704/9 |
| 2006/0031282 | A1 * | 2/2006 | Tuttle et al. ........ 709/203 |
| 2006/0031749 | A1 * | 2/2006 | Schramm et al. ....... 715/500.1 |
| 2007/0204310 | A1 * | 8/2007 | Hua et al. ............ 725/88 |
| 2007/0240064 | A1 * | 10/2007 | Hashiura et al. ....... 715/744 |
| 2008/0033806 | A1 * | 2/2008 | Howe et al. ........... 705/14 |
| 2009/0024916 | A1 * | 1/2009 | Burckart et al. ....... 715/241 |
| 2009/0030921 | A1 * | 1/2009 | Kadiyska et al. ........ 707/101 |
| 2009/0282096 | A1 * | 11/2009 | Kamrowski ........ H04L 67/1095 709/203 |
| 2010/0057928 | A1 * | 3/2010 | Kapoor et al. ......... 709/231 |

FOREIGN PATENT DOCUMENTS

| | | |
|---|---|---|
| WO | WO2006114412 | 11/2006 |
| WO | WO 2008/094145 A1 | 8/2008 |
| WO | WO 2008/097289 A2 | 8/2008 |
| WO | WO 2008/123858 A1 | 8/2008 |
| WO | WO 2009/029078 A2 | 8/2008 |
| WO | WO 2009/067196 A1 | 8/2008 |
| WO | WO2008145679 | 12/2008 |

OTHER PUBLICATIONS

Shao et al., "SMIL to MPEG-4 BIFS Conversion", Proceedings of the Second International Conference on Automated Production of Cross Media Content for Multi-channel Distribution (AXMEDIS'06), 2006 IEEE.
Search Report Dated May 18, 2010.
Lee et al: "Optimization of AP Placement and Channel Assignment in Wireless LANs" Proceedings of the 27tg Annual IEEE Conf on Local Computer Networks (LCN Nov. 2002) pp. 1-6.
Mishra et al.: "A Client Driven Approach for Channel Management in Wireless LANs" presented at infocom 2006. pp. 1-12.
Rozner et al: Traffic Aware Channel Assignment in Enterprise Wireless LANs IEEE Int'l Conf on Network Protocols 2007. published 2007, pp. 133-143.

* cited by examiner

```
<smil xmlns="http://www.w3.org/2001/SMIL.20/Language">
 <head>
  <layout>
   <root-layout id="entire_rgn" width="1920" height="810" backgroundColor="#0000FF"/>
   <region id="top_rgn" left="0" top="0" width="1440" height="810" z-index="1"/>
   <region id="bottom_rgn" left="0" top="810" width="1440" height="150" z-index="1"/>
  </layout>
 </head>
 <body>
  <seq id="main_sequence">
   <par id="main_par">
    <video id="abc" src="resource/test1_1.m2p" region="top_rgn" begin="00:00:00" dur="00:00:45"/>
    <seq id="bottom_seq">
     <img id="234" src="resource/test_view1.jpg" region="bottom_rgn" begin="00:00:00" dur="00:00:15"/>
     <img id="345" src="resource/test_view2.jpg" region="bottom_rgn" begin="00:00:00" dur="00:00:15"/>
     <img id="456" src="resource/test_view3.jpg" region="bottom_rgn" begin="00:00:00" dur="00:00:15"/>
    </seq>
   </par>
  </seq>
 </body>
</smil>
```

*FIG. 3*

```
<smil_override>
    <target_id>456</target_id>
    <operation>replace</operation>
    <new_block>
        <img id="999" src="resource/test_view10.jpg" region="bottom_rgn" begin="00:00:00" dur="00:00:15"/>
    </new_block>
</smil_override>
```

FIG. 4

```
<smil_override>
    <target_id>main_par</target_id>
    <operation>insert</operation>
    <location>
        <key_id>abc</key_id>
        <point>after</point>
    </location>
    <new_block>
    <video id="def" src="resource/test1_2.m2p" region="top_rgn" />
    </new_block>
</smil_override>

<smil_override>
    <target_id>bottom_par</target_id>
    <operation>insert</operation>
    <location>
        <key_id>456</key_id>
        <point>after</point>
    </location>
    <new_block>
        <img id="2341" src="resource/test_view1.jpg" region="bottom_rgn"/>
        <img id="3451" src="resource/test_view2.jpg" region="bottom_rgn"/>
        <img id="4561" src="resource/test_view3.jpg" region="bottom_rgn"/>
    </new_block>
</smil_override>
```

FIG. 5

METHOD AND SYSTEM FOR DYNAMIC PLAY LIST MODIFICATION

CROSS-REFERENCE TO RELATED APPLICATIONS

This application claims the benefit, under 35 U.S.C. §365 of International Application PCT/US2009/004,416, filed 31 Jul. 2009, which was published in accordance with PCT Article 21(2) on 11 Mar. 2010, in English and which claims the benefit of U.S. Provisional Patent Application No. 61/191,051 filed 5 Sep. 2008.

FIELD OF THE INVENTION

The present invention generally relates to presentation systems and, more particularly, to a method and system for the dynamic modification of play lists of such presentation systems.

BACKGROUND OF THE INVENTION

Information and content distribution systems are used to provide information and content to a plurality of end systems. For example, in video-on-demand applications, media content has been provided to and utilized by satellite/cable television subscribers. Typically, subscribers can view selectable media content at their television via the subscriber's set-top-box (STB). In this case, the selected media content or video program is sent from the program center to the set-top-box via the cable or satellite network. Play lists can be implemented in video-on-demand applications to schedule video programming and advertisements.

Similarly, in advertising, it is becoming popular to provide in-store retail media content to customers. This new advertising medium generally uses broadcast distribution as its primary means of content presentation. Recently, retailers and managers of public spaces have populated their stores and public spaces with increasing numbers of video display systems primarily for advertising. In such video display systems, content is distributed by a server to one or more set-top-boxes associated with a respective display or a respective group of displays. Retailers typically use the displays to present their current offerings or sale information or the like. In contrast, managers of the public spaces sell time and space on their video displays to advertisers at a national or local level, with knowledge that large numbers of potential consumers will see the video presentation. Again, in systems such as the in-store retail advertising systems, play lists can be implemented to schedule media content including clips of current offerings, sale information, or advertisements.

In all these systems, many situations can arise that require dynamic changes to the play list to meet business objectives. For example, it may be necessary to substitute a specific media file, or set of media files, for other such files; or it may be necessary to avoid or defer playing a specific media file or set of media files; or it may even be necessary to insert a specific media file or set of media files in addition to the content already in the play list. Building a new play list at a centralized network operations center may not be a viable solution in these exemplary situations. This is especially true when changes are desired at a pace which is not permitted by the centralized network operations center or when play list changes are permitted to be made under control of the local entity without a requirement to coordinate with the centralized network operations center.

Media play lists can be generated by many different languages or technologies. The Synchronized Multimedia Integration Language (SMIL) is a popular play list generation technology used for media playback scripting that enables simple authoring of interactive audiovisual presentations. SMIL is based on XML and is, by nature, a static means of scripting playback. These play lists are static in that they are created prior to playback starting and they remain the same during playback. That is, once created, the play list does not change until rebuilt or reloaded. The play list is a script that is followed by the playback software to determine the layout, sequence, and timing of the presented media. It will be understood herein that the term "play list" is analogous and even identical to the term "play sheet" or "play list sheet" all of which may be used interchangeably herein without any loss or change in meaning.

SMIL is typically used for "rich media"/multimedia presentations which integrate streaming audio and video with images, text, or any other media type. It is an easy-to-learn HTML-like language in which many presentations can be written using a simple text-editor. SMIL pages are sometimes static and sometimes generated dynamically, the way that web pages are built. In this context, when it is said that SMIL pages are sometimes "generated dynamically", it means that the play list is built on demand or just in time for use by reloading or rebuilding the play list; wherein the actual play list that is generated becomes a static entity passed to the playback software for presentation of the media. Unfortunately, any reloading of a SMIL play sheet results in a visible full screen transition between the first SMIL play sheet existing prior to reloading and the newly reloaded SMIL play sheet. This reloading causes the media presentation to lack seamlessness.

Often there is just a desire to add an element or graphic overlay to, or remove an element or graphic overlay from, a sequence of images or videos that have been already defined. For example, in a retail advertising environment, there may exist a desire to present a seamless video presentation to shoppers with no full screen transitions through a black screen or the like. As already discussed above, loading a new SMIL play sheet will interrupt the playback with some type of transition and result in a presentation that is not a seamless presentation of media. In addition, there are times where it is desired to change the presentation on some or all screens in a retail environment to play the same media without any distracting transition that might cut off a video clip mid-way through playback. But, the generation and display of a new SMIL play sheet generates exactly such undesirable and distracting transitions because of the need to reload the SMIL sheet or page that has been changed.

The latest SMIL specification purports to accommodate dynamic changes in media while lacking any details about how such an accommodation might be achieved and implemented. Of course, this is a consistent practice for standards documents that define a high level of functionality or operational capability without giving any details about implementing a design to achieve the required functionality or operational capability. To with, on the W3C website (i.e., w3.org) for the standards document from the period around Jan. 15, 2008, it is stated that, "[u]sing the DOM level 2 methods of SMIL, an application can change the values of attributes and add and delete elements in a running SMIL presentation. Whether such editing is allowed is implementation dependent, although a profile may require support. In terms from the SMIL 3.0 Animation chapter, changing the value of an attribute through a DOM method changes the base value of the attribute. If animations are included in the profile, any animations on the same attribute build upon this changed base value. The presentation value which results from applying an animation is not visible through the DOM. The presentation effect of other changes through the DOM to a document while it is being played back is implementation-dependent." From this excerpt, although it is clear that the transition problem has been recognized from reloading the play sheet in SMIL, it is even clearer that no solution has been provided by the standards developers and contributors.

No mechanism for making these change requests is specified in the SMIL specification. Even web technology can use embedded links in a file, but it does not provide a means to allow an external controller to specify changes asynchronously. While user actions on normal web pages may result in running a JavaScript code that causes the page to connect to a remote server and to obtain changes, no such techniques are available for either the web or SMIL implementations that allow an external processor to send instructions asynchronously to modify a running play list at runtime.

Thus it is clear that there are two problems in the prior art. In one instance, when a SMIL play sheet is loaded and executing in a player or via playback software, there is no standard way to force that player to load a new SMIL play sheet due to changes to the play sheet. Moreover, even if there were a potential means to do this, the reload operation of the SMIL play sheet would result in an undesirable video transition that would negatively affect the viewing experience.

SUMMARY OF THE INVENTION

Embodiments of the present invention address the deficiencies of the prior art by providing a method, apparatus and system for the dynamic modification of media play lists.

Embodiments of the present invention provide a means to deliver a message to a media player asynchronously such that the message provides instructions to change the SMIL (or XML based play list) at runtime without creation or provision of any entirely new play list. This play list modification does not result in a visible, distracting transition as would normally occur during an instruction to reload the SMIL play list. According to an aspect of the present invention, the changes to the media presentation occur without the visually disruptive page reload.

In various embodiments of the invention, the change instructions are generally disseminated from a control system within a network, for example, as opposed to being created as a result of actions taken in a content media player. Such embodiments can be used, for example, for the dynamic insertion of new content at run-time, such as inserting a logo, price, or textual information as a graphic overlay on top of a running media image. According to an aspect of this invention, by having flexibility to make changes dynamically instead of being constrained to pre-define every element on the changed page, it is possible to allow information systems, such as advertising systems, to be much more interactive and event driven.

In one embodiment of the invention, the SMIL player is realized as a Set Top Box (STB). The SMIL player is generally implemented in software on the STB. It is contemplated that the STB can reside on a private network served by a media server. The media server provides a basic SMIL play sheet to each STB so that each STB can begin to execute the media presentation as defined in the respective play sheet. According to an aspect of the present invention, the media server can send messages asynchronously that cause the SMIL player software in each STB to alter dynamically the SMIL play sheet at run time and thus change the media presentation. In other implementations, the change messages may arrive across a Wide Area Network or may be generated by other systems on the private network. Implementations are contemplated where various systems can send messages to various players to alter media playback. As the distribution of the system changes, it is contemplated that a strict client-server model is not necessary for realization of aspects of the present invention.

BRIEF DESCRIPTION OF THE DRAWINGS

The teachings of the present invention can be readily understood by considering the following detailed description in conjunction with the accompanying drawings in which.

It should be understood that the drawings are for purposes of illustrating the concepts of the invention and are not necessarily the only possible configuration or structure for illustrating the invention. In order to facilitate understanding, identical reference numerals have been used, where possible, to designate identical elements that are common to the figures.

DETAILED DESCRIPTION OF THE INVENTION

The present invention advantageously provides a method, an apparatus, and a system for the dynamic modification of media play lists. Although the present invention will be described primarily within the context of a retail advertising network environment using SMIL technology, the specific embodiments of the present invention should not be treated as limiting the scope of the invention. It will be appreciated by those skilled in the art and informed by the teachings of the present invention that the concepts of the present invention can be advantageously applied in substantially any content distribution environment using other authoring tools.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable media and so executed by a computer or processor, whether or not such computer or processor is explicitly shown.

Figure 1:
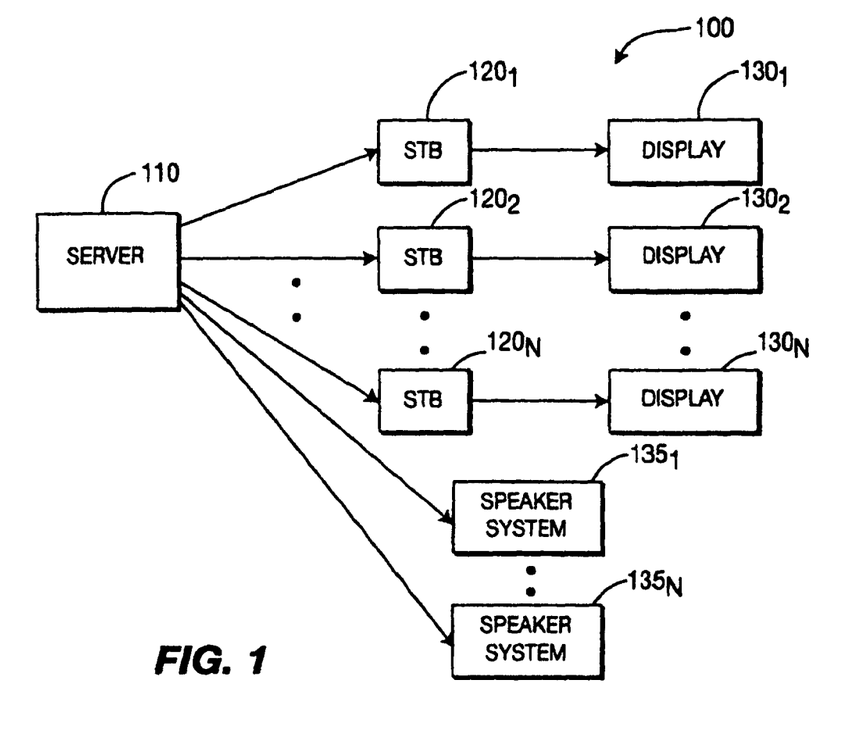
FIG. 1 depicts a high level block diagram of a content distribution system in which an embodiment of the present invention can be applied.

FIG. 1 depicts a high level block diagram of a content distribution system in which an embodiment of the present invention can be applied. The content distribution system 100 of FIG. 1 illustratively comprises at least one server 110, a plurality of receiving devices such as tuning/decoding means (illustratively set-top boxes (STBs)) $120_1$-$120_n$, and a respective display $130_1$-$130_n$ for each of the set-top boxes $120_1$-$120_n$, and other receiving devices, such as audio output devices (illustratively speaker systems) $135_1$-$135_n$. Although in the system 100 of FIG. 1, each of the plurality of set-top boxes $120_1$-$120_n$, is illustratively connected to a single, respective display, in alternate embodiments of the present invention, each of the plurality of set-top boxes $120_1$-$120_n$, can be connected to more than a single display. In addition, although in the content distribution system 100 of FIG. 1 the tuning/decoding means are illustratively depicted as set-top boxes 120, in alternate embodiments of the present invention, the tuning/decoding means of the present invention can comprise alternate tuning/decoding means such as a tuning/decoding circuit integrated into the displays 130 or other stand alone tuning/decoding devices and the like. Even further, receiving devices of the present invention can include any devices capable of receiving content such as audio, or video, or both audio and video content.

Figure 2:
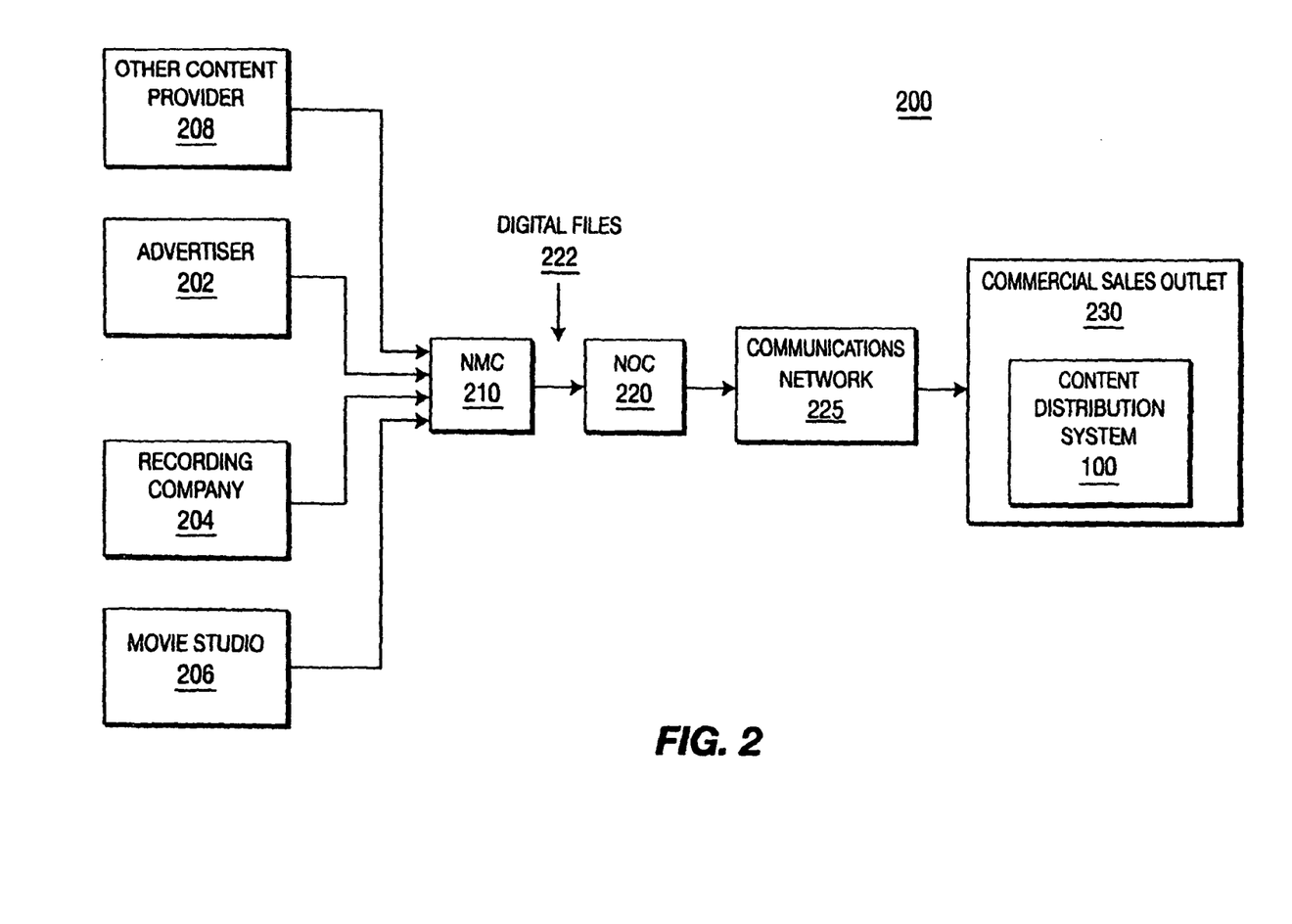
FIG. 2 depicts a high level block diagram of an in-store advertising network for providing in-store advertising.

In one embodiment of the present invention, the content distribution system 100 of FIG. 1 can be a part of an in-store advertising network. For example, FIG. 2 depicts a high level block diagram of an in-store advertising network 200 for providing in-store advertising. In the advertising network 200 of FIG. 2, advertising network 200 and distribution system 100 employ a combination of software and hardware that provides for cataloging, distribution, presentation, and usage tracking of music recordings, home video, product demonstrations, advertising content, and other such content, along with entertainment content, news, and similar consumer informational content in an in-store setting. The media content can include content presented in compressed or uncompressed video and audio stream format (e.g., MPEG4/MPEG4 Part 10/AVC-H.264, VC-1, Windows Media, etc.), although the present system should not be limited to using only those formats.

In an exemplary embodiment of the present invention, software for controlling the various elements of the in-store advertising network 200 and the content distribution system 100 can include a 32-bit operating system using a windowing environment (e.g., MS-Windows™ or X-Windows operating system) and high-performance computing hardware. The advertising network 200 is realizable in a distributed architecture to provide centralized content management and distribution control via, in one embodiment, satellite (or other method, e.g., a wide-area network (WAN), the Internet, a series of microwave links, or a similar mechanism) and in-store modules.

As depicted in FIG. 2, the content for the in-store advertising network 200 and the content distribution system 100 is capable of being provided from an advertiser 202, a recording company 204, a movie studio 206, or other content providers 208. An advertiser 202 is understood to be an exemplary entity such as a product manufacturer, a service provider, an advertising company representing a manufacturer or service provider, or other entity. Advertising content from the advertiser 202 can include audiovisual content including commercials, "infomercials", product information and product demonstrations, and the like.

A recording company 204 is understood to include such entities as a record label, a music publisher, a licensing/publishing entity (e.g., BMI or ASCAP), an individual artist, or any other such source of music-related content. The recording company 204 provides audiovisual content such as music clips (i.e., short segments of recorded music), music video clips, and the like. The movie studio 206 is understood to include such entities as a movie studio, a film production company, a publicist, or other source related to the film industry. The movie studio 106 can provide movie clips, pre-recorded interviews with actors and actresses, movie reviews, "behind-the-scenes" presentations, and similar content.

The other content provider 208 is understood to include any other provider of video, audio, or audiovisual content that can be distributed and displayed via, for example, the content distribution system 100 of FIG. 1.

In one embodiment of the present invention, content is procured via the network management center 210 ("NMC") using, for example, traditional recorded media such as tapes, CD's, videos, and the like. Content provided to the NMC 210 is compiled into a form suitable for distribution to, for example, the local distribution system 100, which distributes and displays the content at a local site.

The NMC 210 can digitize the received content and provide it to a Network Operations Center ("NOC") 220 in the form of digitized data files 222. It will be noted that data files 222, although referred to in terms of digitized content, can also be streaming audio, streaming video, or other such information. The content compiled and received by the NMC 210 can include commercials, bumpers, graphics, audio, and the like. All content files are named according to a preferred convention so that they are uniquely identifiable. More specifically, the NMC 210 creates distribution packs that are targeted to specific sites, such as store locations, and delivered to one or more stores on a scheduled or on-demand basis. The distribution packs, if used, contain content that is intended to either replace or enhance existing content already present on-site, except when the on-site system is being initialized for the first time, in which case the distribution packs delivered from the NMC will form the basis of the on-site system initial content. Alternatively, the content files may be compressed and transferred separately, or there may be a streaming compression program of some type employed.

The NOC 220 communicates digitized data files 222 to, in this example, the content distribution system 100 at a commercial sales outlet 230 via a communications network 225. The communications network 225 can be implemented in any one of several technologies. For example, in one embodiment of the present invention, a satellite link can be used to distribute digitized data files 222 to the content distribution system 100 of the commercial sales outlet 230. This enables content to easily be distributed by broadcasting or multicasting the content to various locations. Alternatively, the Internet can be used to both distribute audiovisual content to and allow feedback from commercial sales outlet 230. Other ways of implementing communications network 225, such as by using leased lines, a microwave network, or other such communications or transport mechanisms are contemplated as being utilized in accordance with exemplary embodiments of the present invention.

The server 110 of the content distribution system 100 is capable of receiving content (e.g., distribution packs) and, accordingly, distributing the content in-store to the various receivers such as the set-top boxes 120 and displays 130 and the speaker systems 135. That is, at the content distribution system 100, content is received and configured for streaming. The streaming can be performed by one or more servers configured to act together or in concert. The streaming content is understood in an exemplary embodiment to include content configured for various different locations or products throughout the sales outlet 230 (e.g., retail store). For example, respective set-top boxes 120 and displays 130 and various speaker systems 135 can be located at specific locations throughout the sales outlet 230 and respectively configured to display content and broadcast audio pertaining to products located within a predetermined distance from the location of each respective set-top box and display.

The server 110 of the content distribution system 100 receives content and creates various different streams (e.g., content channels) of audio, or video, or both audio and video to be communicated to the various receivers throughout the store. The streams can be individual channels of modulated audio, video, and/or audio/video onto a radio frequency distribution or transmitted as data flows within a unicast or multicast internet protocol (IP) network. These streams can originate from one or more servers under the same logical set of control software. The streams can be distributed to one or more individual devices or to one or more groups of devices, where a group of devices is understood to be uniquely addressable as a group including at least one device assigned to that group.

In one embodiment of the present invention, a transport delivery mechanism of the present invention includes a device group control delivery mechanism described in commonly owned International Patent Application No. PCT/US2007/013949, filed Jun. 13, 2007, entitled "Device Group Control", which is expressly incorporated herein by reference in its entirety. In alternate embodiments of the present invention, alternate transport mechanisms can be used, such as the use of a web service type mechanism (Simple Object Access Protocol (SOAP) or Representational State Transfer (REST)) or some other message transport service.

Figure 3:
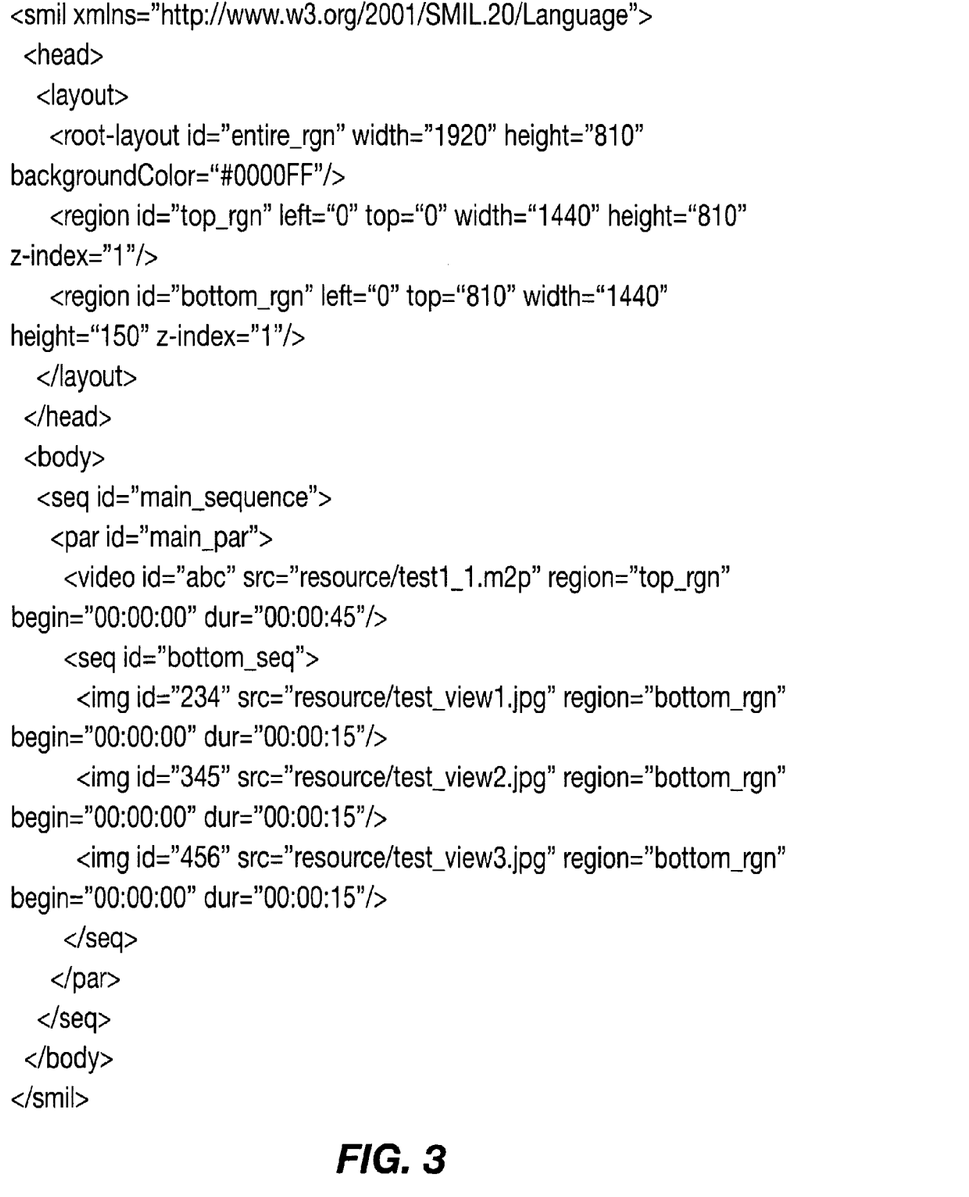
FIG. 3 depicts a high level diagram of an SMIL play list in accordance with an embodiment of the present invention.

FIG. 3 depicts a high level diagram of a simplified SMIL play list in accordance with an embodiment of the present invention. The play list shown in FIG. 3 illustratively comprises two defined regions: a top window comprising 90% of a display, such as the display 130 of FIG. 1, and a banner ad region at a bottom window comprising about 10% of the display 130. The regions are shown in the layout section of the SMIL file delineated by <layout> and </layout>. The play list of FIG. 3 calls for a single video having seq id="abc" to play in a top window of display 130 for a duration of 45 seconds. The bottom window contains three JPG still images having img id="234", img id="345", and img id="456", each to be displayed for a 15 second duration. The example of FIG. 3 is understood to be simplistic in order to show how the changes or over-rides might be accomplished. It will be understood by those skilled in the art that a typical play list comprises many entries and includes many minutes or hours of playing time for the content.

A SMIL play sheet is comprised of a set of sequences. Each sequence is a set of individual media elements that are defined to play in a certain region of a display, at certain time, and for a certain duration. If multiple regions are defined at the same time, then the sequences of media for their respective regions are defined to play in parallel by organizing them into a set. Thus the SMIL defines the layout (regions) for media presentation as well as the timing of the media. This latter timing information, also known as sequencing, is a key difference between HTML and SMIL presentations.

In existing implementations of SMIL players, the play sheet is read into memory and the XML is parsed into a document object module ("DOM") data structure. A timeline is constructed for the presentation and media referenced in elements in the SMIL are presented in sequence at the proper time and in the proper region of the display. If a change is desired in the SMIL such as, for example, deletion of a single media file, then a new play sheet must be generated by reloading or rebuilding the original play sheet without the element that references the deleted media. There is currently no known way to effect change in an existing play sheet without totally reloading the changed play sheet for the SMIL player. When the SMIL player processes the change command such as the delete, it stops playback of the old play sheet, rebuilds a new play sheet, loads the new play sheet into memory. At this point, the XML is parsed into a DOM data structure and the playback process begins again according to the new play sheet. During this period of reloading and reparsing, the player is not delivering the presentation such as video. This, in turn, results in an undesirable media presentation transition for the viewer, a transition from the old presentation (i.e., the old play sheet) to the newly changed presentation (i.e., new play sheet) through a period of blank or black video until the change is completed. In addition, if the command to reload the play sheet arrives during the middle of a media clip, then the clip would be interrupted and end prematurely, before it has played completely. This would likewise result in a poor viewer experience.

Contrary to the prior known embodiments described above, when the present invention is implemented as described herein, changes are made to an existing play sheet without reloading the play sheet with the changed material thereby avoiding any disturbing visible transitions in the presentation for the viewer. The existing play sheet is read into memory and the XML is parsed into a DOM data structure. A timeline is constructed and media referenced in elements in the SMIL is presented at the proper time in the proper region as before. When a change is desired in the SMIL, a message is constructed that describes the change and that message is delivered asynchronously to the SMIL player. The SMIL player makes the desired change, such as an insert, delete, or replace operation, to the DOM resident in memory, while assuming that the current moment of playback precedes the moment in the sequencing timeline that is referenced by the desired change. In this way, the change does not require a new play sheet to be generated, read, and parsed and thereby avoids the undesirable media presentation transition for the viewer.

The various embodiments of the present invention provide a means to deliver change or over-ride instructions for a play list. In one embodiment of the present invention, a change or override message for modification of a media play list is realized as an XML data block. The XML data block of the embodiment of the present invention can include the following elements:

An identification ("ID") of the document object model ("DOM") node to be modified;
An instruction for what kind of operation is to be performed, such as add, delete, insert, or other change);

Optional new node XML block or changed data block information and

Optional location information.

The ID listed above is the standard XML mode ID that must follow the rules specified in the W3C SMIL specification for naming of the node ID. This is a unique key to locate the node in the DOM. It will be understood by those skilled in the art that the ID element is commonly used to find an XML node for exactly this purpose. For example, in FIG. 3, the first video in the sequence has an ID of "abc" and is distinct from the other nodes which have different ID values. It is possible to search the node list for a matching element using the ID field as a key to locate the specific node desired.

The node or changed block information shown above is generally dependent upon the type of instruction being performed. In the case of the delete operation, a node is identified for removal from the play sheet. If the operation is a replacement, then the instruction identifies a node at which replacement takes place as well as the new node replacing the old node. Moreover, for a replacement operation, it is contemplated that the instruction includes an optional new XML data block. In the case of an insert operation where a new data block is to be inserted into the play sheet, the optional location information specifies a relative position such as 'before' or 'after' to tell the software where the new XML block is to be inserted relative to the block identified in the ID field.

The instruction to be performed in the XML data block, as shown in the list above, includes at least one of the following instructions:

Delete;

Replace; and

Insert.

A delete instruction causes the SMIL player to delete an identified node as if it had not been in the play list at all. A replace instruction causes the SMIL player to delete the identified node in the play list and automatically replace it with the provided XML node. An insert instruction causes the SMIL player to insert the new XML node at the end of the container DOM node specified in the ID. For insert instructions, an optional extension may include two additional ID values top identify the two node ID values between which the SMIL player is to insert the newly identified node.

It is important to recognize that an important aspect of this invention is that the play list is being executed by the player while these changes are being pushed asynchronously to the player. In operation, decision logic that may be external to the player decides upon a change for the media presentation and asynchronously sends a control message to the SMIL player or playback software to effect a change to the running play sheet and thereby to change the media presentation. This change is performed "on the fly" and does not require any rebuilding or reloading of the existing play sheet. As a result, the presentation appears substantially seamless with no visible transition. This is significantly different from prior art in many areas. For example, most known systems rely on some type of prompted or synchronous request for change, in essence, an information "pulling" event in contrast to our asynchronous information "pushing" event. Also, the absence of a need to rebuild or reload the play sheet before displaying the changes is different from the prior art. Finally, the lack of a transitions to display the changed presentation is different from the prior art.

In order to illustrate various concepts of the present invention, the following hypothetical scenario will be described: During playback of media in a retail environment, data is processed in the retail environment that results in a run-time decision to show a completely different JPEG file in a last 15 second slot, the file being defined as resource/test_view10.jpg. In operation of one embodiment of the present invention in this hypothetical scenario, a replace command is to be formatted and sent to the player using a message protocol to achieve the necessary change of JPEG files. It is contemplated that current implementations can use a REST or a device group command protocol message for communicating the change message.

Figure 4:
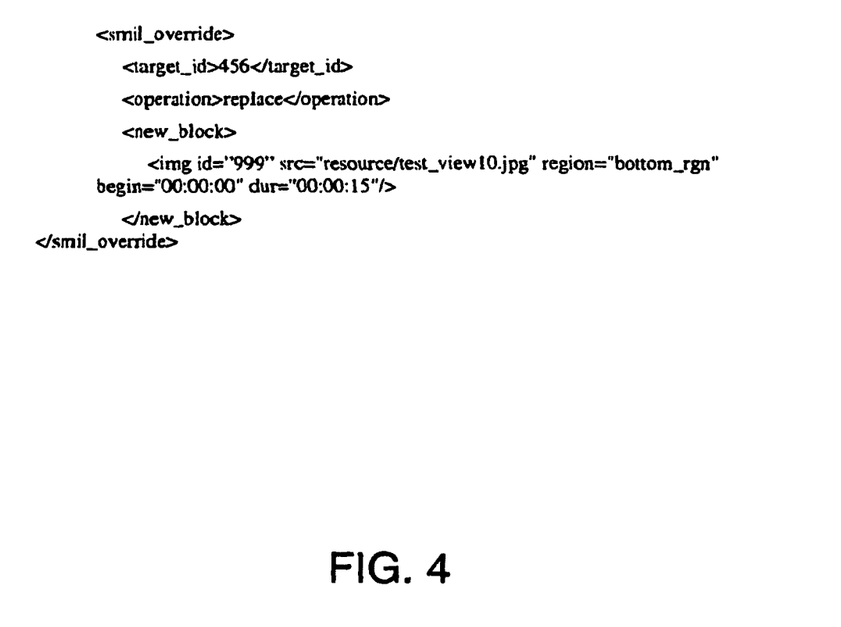
FIG. 4 depicts a high level diagram of the implementation of a replace command in an SMIL play list in accordance with one embodiment of the present invention.

FIG. 4 depicts a high level diagram of the implementation of a replace command in an SMIL play list in accordance with one embodiment of the present invention. A change instruction of the replace type is sent to the player asynchronously without a request by the user or by the player. The operation to replace is delineated by the <operation> and </operation> delimiters. The node being replaced is delineated by the <target_id> and </target_id> delimiters as node "456". The new block being supplied is shown delineated by the <new_block> and </new_block> delimiters as img id="999" having a duration of 15 seconds. The image file is identified as resource/test_view10.jpg. When the replace instruction is executed, the image file resource/test_view3.jpg will be replaced by resource/test_view10.jpg seamlessly and without any disturbing transitions. This replacement is executed without any reloading of the SMIL sheet. It is to be understood that this change is made in the SMIL player while executing the media playback. In accordance with an aspect of the present invention, no SMIL play sheet reload occurs and thus the visible transition effect of such a reload is avoided.

In an alternate embodiment of the present invention, a running play list can be extended with more media. Such an embodiment can include adding a video element to the top window of the display 130 described above and more image elements to the bottom window of the display 130 described above. This type of change can be accomplished via the insert instruction described above.

Figure 5:
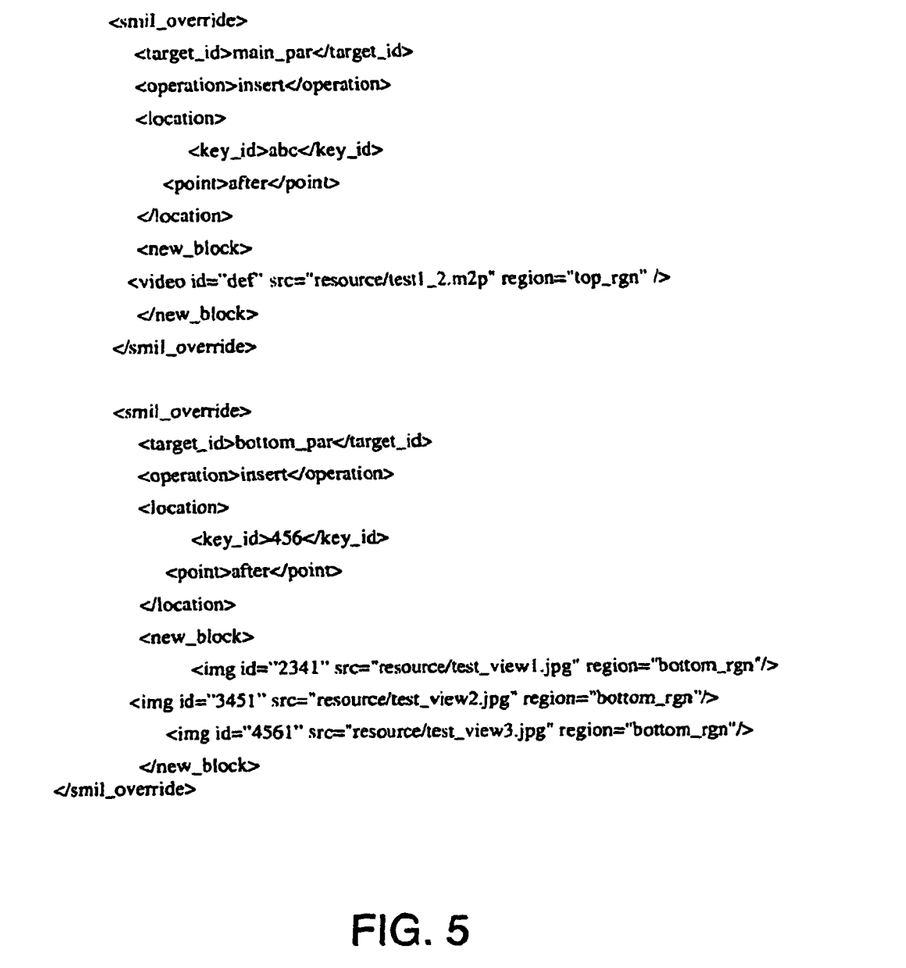
FIG. 5 depicts a high level diagram of the implementation of an insert command in an SMIL play list in accordance with one embodiment of the present invention.

FIG. 5 depicts a high level diagram of an exemplary implementation of an insert command in an SMIL play list in accordance with one embodiment of the present invention. The embodiment of FIG. 5 depicts that two new media blocks are to be inserted onto the end of the two regions of the play list. The operation to insert is delineated by both sets of the <operation> and </operation> delimiters.

In the first insert operation, the location for insertion is delineated by the <location> and </location> delimiters as being at a point after node "abc". The new block being inserted is shown delineated by the <new_block> and </new_block> delimiters as video id="def" in the top region. The video file is identified as resource/test1_2.m2p. When this insert instruction is executed, the video file resource/test1_2.m2p for node "def" will be inserted after video file resource/test1_1.m2p for node "abc" seamlessly and without any disturbing transitions. This insertion is executed without any reloading of the SMIL sheet.

In the second insert operation, the location for insertion is delineated by the <location> and </location> delimiters as being at a point after node "456". The new block being inserted is shown delineated by the <new_block> and </new_block> delimiters as three image files for the bottom region identified as image id="2341", image id="3451", and image id="4561". The respective image files are identified as resource/test_view1.jpg, resource/test_view2.jpg, and resource/test_view3.jpg. When this second insert instruction is executed, the image files resource/test_view1.jpg, resource/test_view2.jpg, and resource/test_view3.jpg for nodes "2341", "3451", and "4561", respectively, will be inserted after image file resource/test_view3.jpg for node "456" seamlessly and without any disturbing transitions. Again, this insertion is executed without any reloading of the SMIL sheet.

In a manner similar to the instructions shown in FIGS. 4 and 5 above, the delete instruction can be constructed. This instruction simply includes a description of the operation being performed and the target_id node being deleted. The deletion of the identified node is performed seamlessly and without any disturbing transitions. Again, this insertion is executed without any reloading of the SMIL sheet.

In accordance with embodiments of the present invention, additional types of changes can include the addition of a previously undefined region to a running play list so that new media element nodes can be added to play in that newly defined region. Such an operation can be expressed in terms of a group of standard insert operations. A practical application of this type of change would be to instruct the player to present a region on top of a running media at run-time. In this example, one could consider inserting a logo for a short period, or a banner with a special price, or an alert about some condition in that newly created region. Because of the functionality of the embodiments of the present invention, such regions do not have to be pre-determined to add into the SMIL play list prior to rendering that play list. Instead, such regions can be dynamically created and displayed at run time. Such messages or dynamic content regions can be considered dynamic screen popup messages, using, for example, SMIL technology. In a manner similar to the other change instructions, these instructions are delivered asynchronously and are performed seamlessly and without any disturbing transitions. Again, this type of insertion is executed without any reloading of the SMIL sheet.

SMIL play sheets refer to media using XML elements. Examples of these elements include video ("<video>"), audio ("<audio>"), and image ("<img>"). Each of these XML elements is typically defined by certain attributes including an identifier ("id"), media source ("src"), duration ("dur"), and start time ("begin"). It is contemplated that attributes other than those shown above may be added to an XML element while still generating elements that remain SMIL compliant. For example, a new attribute might be added to control transparency of an image or video element. Other such exemplary attributes are commonly used in many implementations such as photo editing (e.g., Adobe® Photoshop®) and office suite applications and services (e.g., Microsoft® Office products).

It will be appreciated that a control message according to this invention for replacement of a SMIL element may change one or more of these attributes. For example, while the source of the media may stay the same, the control message may direct a change to its duration. Further, the control message may direct a change in the source by pointing to a different media file. It is also entirely possible that the control message may direct a change to a new element that is completely different from the element being replaced.

In one embodiment of the present invention, an interface is provided to allow the current SMIL play list as understood by the player to be obtained. In one embodiment of the present invention, the interface comprises an embedded web server in the player. By using a web client such as a browser or proprietary commands, the web client could make a query to a well understood URL on the player and obtain the actual play list as understood by the player at that moment in time. That is, it would obtain a representation of the actual DOM contained in an SMIL player. This could be used to provide a baseline for making changes or to validate that operations were performed. As such a matching synchronized state of what DOM nodes are currently assigned in the player do not need to be maintained by a control device such as the server 110 of FIG. 1. In one embodiment, such an interface could comprise an HTTP "Get" operation using an embedded web server in the SMIL player.

It should be noted that the term "display" as used throughout this specification should not be considered as being limited to the presentation of video, but can be representative of exemplary embodiments such as the presentation of video on a display or the presentation of audio on a speaker or the presentation of both audio and video on an integrated device or the like. In addition, it should be noted that the terms "media content" and "media portion" and "media clip" used throughout the teachings of this disclosure are intended to identify media content including video portions, or audio portions, or both video and audio portions.

Having described various embodiments for a method, apparatus and system for the dynamic modification of media play lists (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention. While the foregoing is directed to various embodiments of the present invention, other and further embodiments of the invention may be devised without departing from the basic scope thereof.

The invention claimed is:

1. A method for providing a dynamic modification of at least a portion of a presentation, said presentation comprising a play list including a plurality of play sheet elements and a sequencing timeline for playback of said play list, at least one play sheet element being selected from a group consisting of at least one of an image element, a video element, and an audio element, the method comprising:
   storing the play sheet elements and parsing extended machine language of the play sheet elements into a document object model data structure;
   in response to an asynchronously received control message, identifying a location in the presentation that requires a change, and identifying a respective play sheet element that requires said change, said change including at least one operation selected from the group of operations consisting of deletion, insertion, and replacement; and
   making said change to a respective document object of the identified play sheet element changing a portion of the presentation in accordance with the at least one operation at the identified location during playback of the playlist such that a current moment of playback precedes a moment that the change takes effect at a scheduled presentation time of the identified location in the presentation, said change taking effect without requiring a reloading of the play sheet elements or generating new play sheet elements.

2. The method of claim 1, wherein said presentation is authored using a synchronized multimedia integration language.

3. The method of claim 1 wherein said play sheet elements are identified using attribute information which includes at least one of an identifier ("id"), a media source ("src"), a duration ("dur"), and a start time ("begin").

4. The method of claim 1 wherein a server generates the control message including said identified location, said change, and information identifying a play sheet element and a respective document object to be changed when necessary and asynchronously sends said control message to a presentation device.

5. The method of claim 4 wherein said presentation device is selected from a group consisting of a set top box and a software player.

6. The method of claim 4 wherein said sending comprises transmitting the control message to at least one group of devices selected from a plurality of presentation devices, wherein the at least one group includes at least one presentation device.

7. A system for providing a dynamic modification of at least a portion of a presentation, said presentation comprising a play list including a plurality of play sheet elements and a sequencing timeline for playback of said play list, each play sheet element being selected from a group consisting of an image element, a video element, and an audio element, the system comprising:
   at least one presentation device:
   a node connected via a communications network to said at least one presentation device, said node comprising a processor and memory configured to:
      identify a location in the presentation that requires change to at least one play sheet element of the plurality of play sheet elements, said change including at least one operation selected from the group of operations consisting of deletion, insertion, and replacement; and
      communicate to the presentation device an asynchronous control message identifying the location in the presentation that requires change; and
   said at least one presentation device comprising a processor and a memory configured to store the play sheet elements and parse extended machine language of the play sheet elements into a document object model data structure and, in response to an asynchronously received control message identify a location in the presentation that requires a change,
   identify a respective play sheet element that requires said change, said change including at least one operation selected from the group of operations consisting of deletion, insertion and replacement, and
   make said change to a respective document object of the identified play sheet element in accordance with the at least one operation at the identified location during playback of the playlist such that a current moment of playback precedes a moment that the change takes effect at a scheduled presentation time of the identified location in the presentation, said change taking effect without requiring a reloading of the play sheet elements or generating new play sheet elements.

8. The system of claim 7 wherein said presentation device is selected from a group consisting of a set top box and a software player.

9. The system of claim 7 wherein the control message is communicated to at least one group of devices selected from a plurality of presentation devices, wherein the at least one group includes at least one presentation device.

10. The system of claim 7 wherein said communications network comprises a wide area network.

\* \* \* \* \*